Patented July 21, 1942

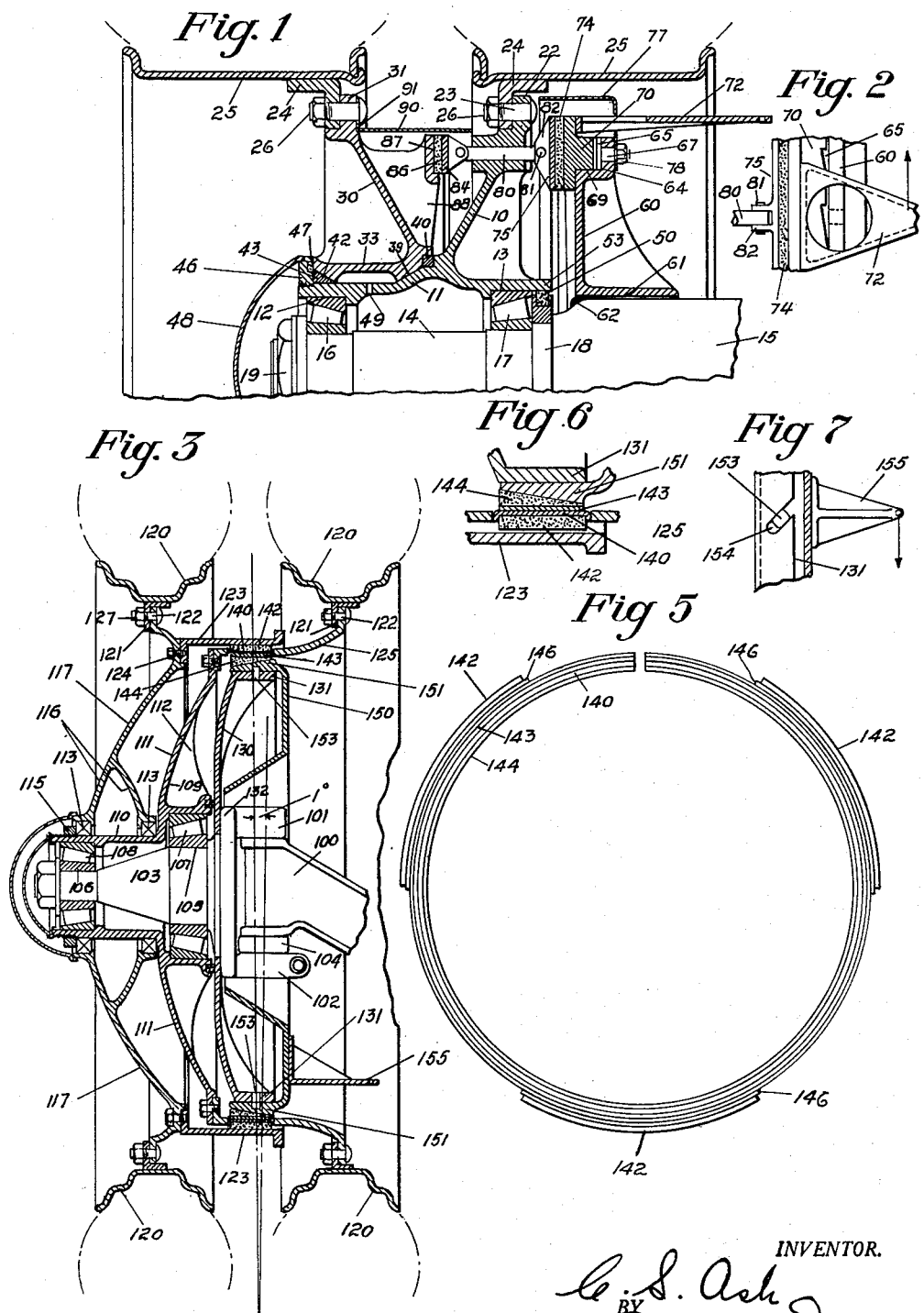

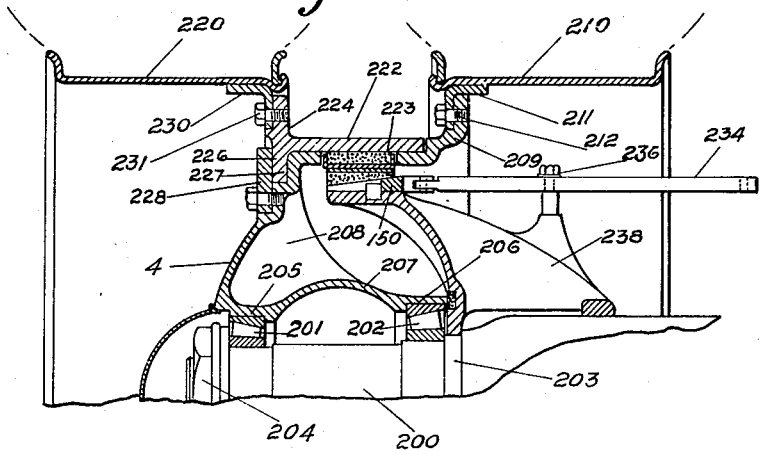

2,290,160

UNITED STATES PATENT OFFICE 2,290,160

DUAL WHEEL VEHICLE

Charles S. Ash, Milford, Mich.

Application January 24, 1939, Serial No. 252,596

9 Claims. (Cl. 188—18)

The present invention relates to new and useful improvements in dual vehicle wheels and more particularly to the braking mechanism for such wheels.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate several modifications of the invention, and together with the description, serve to explain the principles of the invention.

Of the drawings:

Figure 1 is a fragmentary vertical section showing an illustrative embodiment of the braking means of the present invention as applied to the dual wheels of a road vehicle;

Figure 2 is a fragmentary detail showing the brake operating cam of the embodiment of Figure 1;

Figure 3 is a vertical section showing a modified embodiment of the invention as applied to dual front or dirigible wheels of a vehicle;

Figure 4 is a fragmentary section showing a further illustrative embodiment of the invention;

Figure 5 is a detailed elevation of a clutch or brake band as used in the embodiment of Figures 3 and 4;

Figure 6 is a detailed transverse section of the brake band shown in Figure 5;

Figure 7 is a detailed fragmentary section of the brake operating mechanism of the embodiment of Figure 3;

Figure 8 is a detailed fragmentary section of the brake operating mechanism shown in Figure 4;

Figure 9 is another modified and illustrative embodiment of the invention as applied to dual trailing wheels; and Figure 10 is a detailed fragmentary section of the brake operating means shown in Figure 9.

The present invention has for its object the provision of a novel and improved dual wheel structure for use with automotive road vehicles. A further object is the provision of an improved braking structure for simultaneously applying a retarding effort opposing the rotation of both of two independently-rotatable, side-by-side wheels. Still another object is the provision of a simplified and more economically constructed dual wheel structure providing for the independent rotation of the dual wheels. The invention also provides a compact, efficient and economical dual wheel assembly in which the brake for the outer wheel is directly energized and actuated by application of the brake means to the inner wheel by means of the axial movement of one of the braking members against a part carried by the inner wheel which is also movable into contact with the braking or clutching member on the outer wheel.

In accordance with the illustrative embodiment of the present invention, there are provided two wheels, mounted in side-by-side relation for coaxial independent rotation so that each of the wheels may roll freely over the surface of the road without dragging or otherwise subjecting the tires to excessive wear. The inner and outer wheels of the dual wheel assembly are telescopically mounted so as to increase the bearing surface and to reduce the overall axial dimension, and the outer wheel may be mounted for rotation on the inner wheel by means of a bearing of relatively large diameter which preferably comprises a bearing flange near the periphery of the inner wheel on which is seated a bearing ring of similar diameter carried by and fixed to the outer wheel. Means are provided for simultaneously applying a braking force to both the inner and outer wheels so that the vehicle may be stopped by the friction between both wheels and the road, and as embodied there is provided a braking member which is held against rotational movement beyond a predetermined amount and such rotational movement as it has is translated into an axial movement to move the braking member into braking contact with a brake member carried by and rotatable with the inner wheel. The braking member carried by the inner wheel is also provided with a portion which is movably mounted and is directly actuated by contact of the two braking members so as to move it into powerful contact with another braking or clutching member carried by the outer wheel, and as the first braking member is axially moved into contact with the second member on the inner wheel, the second member is correspondingly moved into contact with the third braking member on the outer wheel, thereby clutching the two wheels together to prevent their relative rotation and retarding both two wheels in unison until the primary braking means is restored to its released position.

It will be understood that the foregoing general description and the following detailed description as well, are exemplary and explanatory of the invention but are not restrictive thereof.

Referring now in detail to the illustrative embodiment of the present invention as shown in Figures 1 and 2 of the accompanying drawings, an inner wheel 10 provided with a hub 11 having spaced apart bearing seats 12 and 13 is mounted for rotation upon the reduced end 14 of a dead or trailer axle shaft 15 by means of the tapered roller bearings 16 and 17 which are held in place by means of shoulder 18 and nut 19. At the outer end of the spokes 22 are provided apertures 23 registering with the holes in lug 24 attached to and extending radially inwardly from the tire rim 25, and the rim is secured to the spoke ends by means of bolts 26.

The outer wheel 30 is formed with similar spoke ends 31 and the outer rim 25 is secured to these spokes by means of bolts 26 passing through the apertures in the spoke ends and in the outer rim lugs 24. Means are provided for rotatably supporting the outer wheel upon the hub of the inner wheel with their hubs in telescopic relation and as embodied cooperating tapered bearing surfaces 39 are formed on the hubs 33 and 11 and lubricant is retained by means of ring 40 which is seated in an annular groove on the hub 11 of the inner wheel 10 and fits into a corresponding bearing surface in the hub 33 of the outer wheel 30. At the other end of the hub 33 is provided a beveled bearing surface 42 which rests upon a conoidal bearing ring 43 interiorly supported upon the outer end of the hub 11, and held against axial displacement by means of the threaded retaining ring 46, which is grooved to receive a ring 47 of packing material, and is also formed to support the hub cap 48. Bearing rings 40 and 43 are preferably spaced as far apart as practical so as to minimize the shock loading of the bearings, at the same time permitting the outer and inner wheels to rotate independently of each other. The interior of hub 11 is preferably hollow to receive suitable lubricant which may be fed to the bearings for the outer wheel through an aperture 49, while the lubricant is retained within the hub 11 by means of a packing ring 50 surrounding the shoulder 18 and retained by means of the cylindrical inwardly projected portion 53 of the hub 11.

The braking means comprises circular disc or anchor plate 60 having an inwardly projecting cylindrical portion 61 to fit around the axle 15 to which it is welded as at 62. Around the periphery of disc 60 is provided a groove 64 into which is fitted a ring 65 having its outer face formed as a plurality of wedges, this ring being retained in the groove by means of bolts 67. Fitted to the cylindrical portion 69 of the groove is a brake lining support 70 which has limited rotational movement with respect to the anchor plate 60, and the inner faces of the support 70 is formed with a corresponding series of wedges which rest upon the wedges 65 and cause an axial movement of the support 70 as it is rotated. An arm 72 is fast to support 70 and extends inwardly thereof and may serve as the member to which the brake operating cable is connected. On its outer face support 70 is provided with an annular brake lining 74 which is adapted to contact with a brake shoe 75, and all of these parts are enclosed within the cylindrical sheet metal cover 77 which is held in place by means of the nuts 78 on bolts 67.

The annular brake shoes 75 are supported upon and secured to the wheel 10 by means of the axially movable rods 80 movable within corresponding apertures in the spokes of wheel 10, rods 80 being apertured at their ends to receive pin 81 passing through the apertures in lugs 82 formed on the shoe 75. As the member 70 is moved axially outwardly, or closer to the wheel 10, pressure is exerted between friction surfaces 74 and 75 to retard the rotation of wheel 10.

For clutching the inner wheel 10 to the outer wheel 30 so that the two wheels will be braked in unison, an annular shoe 84 is mounted on the outer end of rods 80 so that it also rotates with the wheel 10 and is moved axially with the shoe 75. Member 84 is alined with and adapted to contact with brake lining 86, also of annular form, which is secured to the wheel 30 within an annular groove 87 formed integrally with the wheel and connected to the spokes by means of the web portions 88. This clutch mechanism is enclosed and protected against dust by means of the cylindrical cover plate 90 having a flared rim 91 by which and the bolts 26 it is secured to the wheel 30.

In the operation of this embodiment of the invention, the wheels 10 and 30 normally rotate in unison, but are always free to rotate independently of each other whenever the wheels are being turned around a curve, or whenever there is any slight tendency for them to travel at different speeds as over uneven roads or when the tires are unevenly deformed due to unequal inflation or loading. When it is desired to brake the wheels, arm 72 is moved to cause an outward movement of brake member 70, thereby pressing the friction surfaces 74 and 75 into contact with each other and at the same time moving the friction surfaces 84 and 86 into contact with each other. This causes wheels 10 and 30 to be clutched together so that the two wheels act as one and the braking force applied to the inner wheel is transmitted to the outer wheel so as to retard the rotation of both wheels.

Figures 3, 5, 6 and 7 show a modification of the invention as adapted for use in connection with the front or dirigible dual wheels of an automotive vehicle. As embodied, the front axle comprises an axle beam 100 formed at its ends to receive a king pin which is secured in the eyes 101 and 102 above and below the axle end 100, these eyes being integral with the axle spindle 103. Suitable steering knuckle means are provided for varying the angular relation of the spindle to the axle beam, and a thrust bearing 104 supports the axle load upon the spindle eye 102. While the king pins, at the two ends of the axle beam 100, are preferably parallel to each other, the planes of the wheels preferably diverge very slightly in an upward direction, and as shown, this divergence may be of the order of one degree at each end or a total of two degrees for the two sets of dual wheels.

Spindle 103 is provided with bearing seats 105 and 106 upon which are mounted the tapered roller bearings 107 and 108 forming the antifriction support for the inner wheel 109. Wheel 109 is formed as a stepped cylindrical hub portion 110 provided with a disc portion 111 and strengthening ribs 112. Supported upon the outer part of the cylindrical hub 110 are the bearings 113 for the outer wheel, and these are held in place by means of the step and the retaining ring 115 threaded on the outer portion of hub 110. Bearings 113 bear against surfaces formed on the interior or hub portion of the outer wheel 116 and these are joined together and merged into a convex disc portion 117. At the peripheral portion of the outer wheel, a ring member is provided to receive the tire rim 120 which is connected to the wheel by means of lugs 121 and bolts 122, while adjacent the periphery a cylindrical brake drum 123 is secured to the wheel 117 by screws 124. Wheel 111 terminates in an annular flange to which is bolted an inwardly extending member 125 of gradually increasing diameter on the interior of which is supported the inner tire rim 120, this rim being secured to the member 125, and thereby to wheel 111 by means of the lugs 121 and bolts 122.

Brake supporting means are provided for the wheels and comprise the dished member 130 having a cylindrical peripheral flange 131 on which the brake band 140 and actuator 150 are mounted. Member 130 is fixedly supported on the enlarged portion 132 of spindle 103. Member 125 is apertured circumferentially to receive the spaced-apart projecting portions 142 of the brake band 140 and permit them to contact with the outer drum 123.

Brake band 140 comprises a resilient flat strip 143 rolled to annular form and having its ends closely adjacent. On the inner side of the band is a brake lining 144 of beveled section extending the length of the band, while spaced apart lengths of brake lining 142, mounted on suitable backing members 146 are attached to the concave side of the lining 142 and permit the securing together of the inner and outer linings. Backing members 146 are preferably of a sufficient length and width to substantially fill the apertures in the member 125.

Brake expanding means are provided and comprise the dished actuator member 150. The outer peripheral and beveled portion 151 fits snugly over flange 131 and is rotatable thereon. The flange of drum 150 is provided with radially inwardly projecting pins 153 which project through helical slots 154 in the flange 131, and as the member 150 is rotated slightly by pull of the brake cable on arm 155, it is axially moved so as to wedge the brake band 140 radially outwardly against the drum 123, and stop the outer wheel 117 by friction between the drum 125, the brake band 140 and the actuator drum 150, while the inner wheel 111 is held against rotation by the arcuate members 142 and 146.

Figures 4 and 8 show another modification suitable for use on a trailing or non-driven axle. As embodied, the wheels are supported on the reduced end of axle shaft 200 by means of bearings 201 and 202, which are held in position by means of shoulder 203, nut 204, and bearing seats 205 and 206 formed in the hub 207 of wheel 208. Wheel 208 extends cylindrically inwardly to form a flange 209 onto which the inner tire rim 210 is fastened by means of lugs 211 and bolts 212.

The outer tire and rim 220 are supported on wheel 208 for free and independent rotation and the cylindrical portion 222 of wheel 208 is finished to provide a journal on which the inwardly projecting cylindrical portion 223 of outer wheel 224 is mounted. Outer wheel 224 is held against axial movement by means of flange 226 which fits into the space between groove 227 and ring 228 bolted to the wheel 208. The outer rim 220 is held to the outer wheel by means of lugs 230 and cap screws 231. The inner and outer wheels are simultaneously braked in the same general manner as shown in Figs. 3 and 5, but the axially movable beveled ring 150 is moved by means of lever 234 having a forked end 233 and pivoted at 236 on the brake anchor 238. In this modification, however, the brakes and journals for the two wheels are combined resulting in a simpler, more compact and less expensive construction.

Figures 9 and 10 show a further modification of the invention in which the inner wheel also supports the outer wheel by means of a journal of nearly the same diameter as the wheel, and the wheels are braked in unison in the general manner of the embodiment of Figure 1. As embodied, the inner wheel 240 is formed with a finished bearing surface 241 of annular form and a retaining and clutching ring 242 secured by screws 243. The outer wheel 245 includes an inwardly projecting flange 246 which fits into and rides on the bearing 241.

The inner surface of ring 242 is faced with brake lining to contact with the outer face of the wheel flange 246, while the inner face may be engaged by brake lining 248 mounted on the ring 249. Ring 249 is axially moved by slidable rods 250 guided by apertures in the wheel ribs 251 and these rods are, in turn, moved by pressure of the brake shoe 254 against the brake lining faced on ring 256 to which the inner ends of rods 250 are fast.

The brakes are applied by means of lever 260 pivoted at 261 on brake support 262 and its end 263 engages a notch 264 in the cam faced shoe 254, so that limited rotational movement of the brake shoe 254 causes the braking force to be concurrently applied to both wheels in unison.

The invention in its broader aspects is not limited to the specific mechanisms shown and described but departures may be made therefrom within the scope of the accompanying claims without departing from the principles of the invention and without sacrificing its chief advantages.

What I claim is:

1. A braker dual wheeled assembly for road vehicles including in combination a pair of wheels rotatably mounted side by side for relative rotation and braking means for the wheels including a brake member fixed to one wheel, a second brake member fixed to the other wheel and in contiguous relation to the first member and movable into contact with the first braking means, a third braking member held against rotation and axially movable into contact with the second member and means for relatively moving the first and second brake members by axial movement of the third for stopping both wheels in unison.

2. A braked dual wheeled assembly for road vehicles including in combination a pair of wheels rotatably mounted side by side for relative rotation and braking means for the wheels including a plurality of braking members, one of which is axially movable and is held against rotation with the wheels, another being attached to each of the wheels, and means for contacting a member on one wheel with a member on another wheel for frictionally retarding relative rotation of the wheels by movement of the axially movable member into braking contact with one of the other braking members.

3. A braked dual wheeled assembly for road vehicles including in combination a pair of wheels rotatably mounted side by side for relative rotation and braking means for the wheels including a plurality of braking members, one of which is axially movable and is held against rotation with the wheels, another member being attached to one of the wheels while a third member is attached to the other wheel and may be engaged by the first and second braking members by axial movement of the first.

4. A braked dual wheeled assembly for road vehicles including in combination a pair of wheels rotatably mounted side by side for relative rotation and braking means for the wheels including a braking member fixed to an outer wheel, another braking member mounted on a stationary part and an intermediate braking member having parts to contact with the first and second braking members, said second braking member being axially movable into contact with the intermediate member to concurrently stop the wheels.

5. A braked dual wheeled assembly for road vehicles including a pair of wheels rotatably mounted side by side for relative rotation, coacting braking members, one for each wheel fast to the wheels and in contiguous relation, and axially movable braking means held against rotation to contact with one of the braking members and move it into contact with the other braking means and retard the rotation of both wheels.

6. A braked dual wheeled assembly for road vehicles including a pair of wheels rotatably mounted side by side for relative rotation, coacting braking members, one for each wheel, means for connecting each braking member to its wheel, a braking means axially movable of the wheels but held against rotation, means for pressing the braking means against the braking member for one wheel and means for directly transferring the pressure from the braking means to the braking member for the other wheel whereby the two wheels may be locked together and stopped concurrently.

7. A dual wheel assembly including in combination a rotatable wheel having a cylindrical portion, a second wheel having a cooperating cylindrical portion whereby the wheels are journalled on each other by telescoping the cylindrical portions, and braking means for the wheels acting on the cylindrical portions and including the cylindrical portion of one wheel as a brake drum.

8. A dual wheels assembly including in combination a rotatable wheel having a cylindrical portion, a second wheel having a journal to fit over the cylindrical portion for relative rotation of the wheels, a brake member, and an intermediate member acting on the journal whereby both wheels may be stopped by the brake member.

9. A dual wheel assembly including in combination a pair of dual wheels in coaxial, side-by-side relation, and independently rotatable and braking means for the wheels comprising friction elements carried by the wheels and a stationary element, said elements being of circular form and overlying each other in telescopic relation.

CHARLES S. ASH.